United States Patent [19]

Imbriano

[11] 3,948,069

[45] Apr. 6, 1976

[54] VEHICLE IGNITION LOCK DEVICE

[76] Inventor: Modestino Imbriano, 10 1/2 Jacques St., Somerville, Mass. 02145

[22] Filed: Mar. 3, 1975

[21] Appl. No.: 554,568

[52] U.S. Cl. .................................. 70/428; 70/418
[51] Int. Cl.² .................................... E05B 17/14
[58] Field of Search ......... 70/15, 18, 158, 163, 164, 70/166, 211, 212, 237, 423–428, 416–418; 200/44, 45, 61.54

[56] References Cited
UNITED STATES PATENTS

| | | | |
|---|---|---|---|
| 3,665,738 | 5/1972 | Pescuma | 70/211 |
| 3,811,303 | 5/1974 | Robertson | 70/237 |

*Primary Examiner*—Robert L. Wolfe
*Attorney, Agent, or Firm*—Wolf, Greenfield & Sacks

[57] ABSTRACT

The device covers the ignition lock which is conventionally mounted on the vehicle steering column and comprises a lock housing and a C-shaped band received by the lock housing which together cooperate to form a shroud or cover for the ignition lock. The housing has a pair of latching devices for receiving the band and locking the band relative to the housing. The latching devices are operated from a key lock which permits release of the latching devices. The housing is positioned so that the key lock faces the vehicle dashboard so that there is little space between the key receiving lock and the dashboard thereby making it difficult for an unauthorized person to "jimmy" the lock open using a prying device or the like.

11 Claims, 4 Drawing Figures

VEHICLE IGNITION LOCK DEVICE

BACKGROUND OF THE INVENTION

The present invention relates, in general, to a device used in association with the ignition lock of a vehicle to prevent theft of the vehicle. More particularly, the present invention relates to an ignition lock safety shroud.

Many inventions have been disclosed in the prior art for preventing the theft of vehicles. These devices are generally either of the mechanical or electronic type. Most of the conventional ignition lock systems are now mounted on the steering column so that the steering can be locked when the ignition is in its locked position. These devices are somewhat satisfactory. However, the criminal somehow has access to master keys making the theft quite easy. Also, the conventional steering column locking device can apparently also be released by prying on the lock which is on the side of the steering column.

Accordingly, one object of the present invention is to provide an improved ignition lock safety device. According to the invention, the device comprises a safety shroud having a key lock associated therewith for covering the ignition lock.

Another object of the present invention is to provide an ignition lock safety shroud in accordance with the preceeding object and wherein the key receiving lock for the device is positioned facing the vehicle dashboard thereby providing little or no access to the lock. In accordance with the present invention, therefore, the device is difficult to tamper with and pry open.

A further object of the present invention is to provide an ignition lock safety shroud that basically comprises a lock housing and interengagable C-shaped band and wherein the device may also comprise a release plunger for forcing the basic components apart when the device is unlocked.

Still another object of the present inventon is to provide an ignition lock safety shroud that is relatively simple in constructon, easy to operate, can be fabricated relatively inexpensively and can be readily stored at a lower section of the steering column when not in use.

SUMMARY OF THE INVENTION

To accomplish the foregoing and other objects of this invention, there is provided an ignition safety lock for an automobile or the type having the ignition lock on the steering column. The safety locking device in accordance with this invention generally comprises a C-shaped clamp and a shroud in the form of a housing adapted to removably receive the arms of the C-shaped clamp. The C-shaped clamp extends about the steering column from the side opposite the ignition lock of the vehicle and the arms of the clamp extend generally tangentially from the column on opposite sides in a position to be received by the shroud. The housing receives the steering column ignition lock when the housing and clamp are locked in place about the steering column. The housing has associated therewith latching means for releasably latching the arms and housing together in a position wherein the housing encloses the ignition lock. There is provided a lock carried in the housing and connected to the latching means for releasing the latching means so that the shroud may be removed from covering the ignition lock.

The device may also comprise a loaded plunger or the like biasing device that engages the steering column when the safety shroud is locked in place. When the lock is opened, the plunger serves to force the housing from the ends or legs of the C-shaped clamp thereby facilitating easy removal of the device from about the ignition lock of the vehicle.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
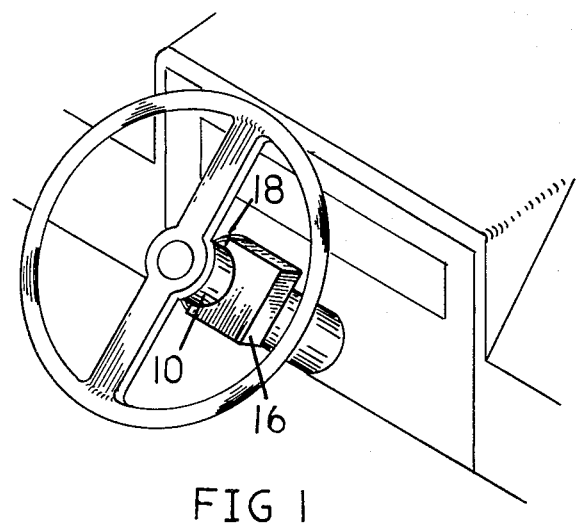
FIG. 1 is a perspective view showing the device of the present invention fastened about the steering column of a vehicle.
Figure 3:
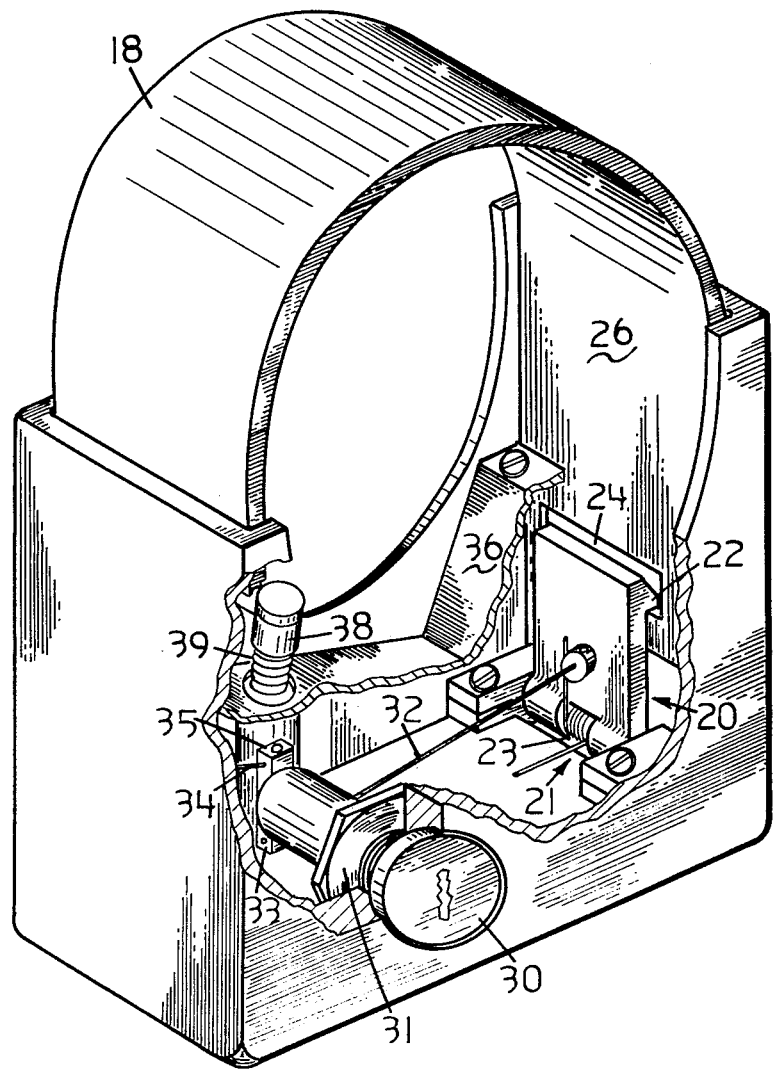
FIG. 3 is a perspective view partially cut-a-way showing the device of the present invention in its interengaged position but not about the steering column.
Figure 4:
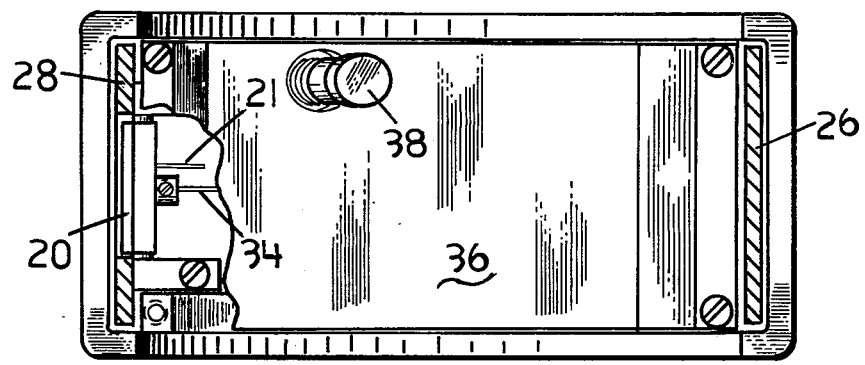
FIG. 4 is a cross-sectional plan view through the C-shaped band shown in FIG. 3.
Figure 2:
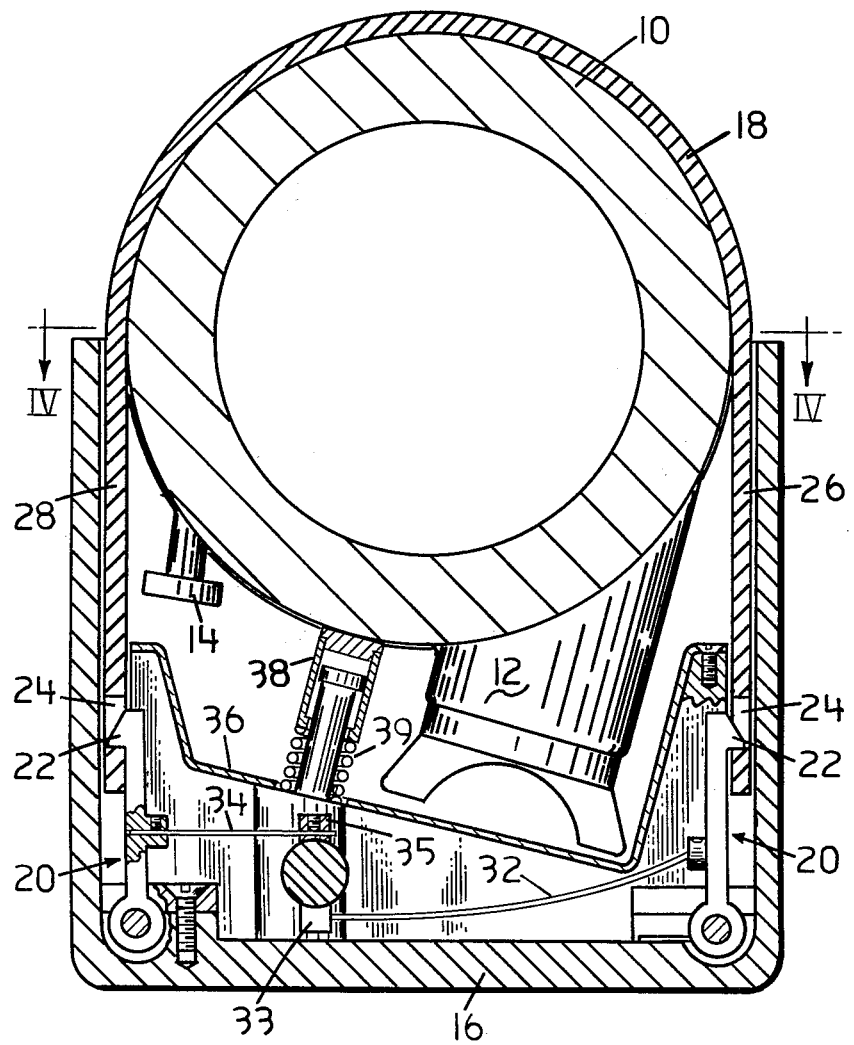
FIG. 2 is a cross-sectional view through the device of the present invention in its position secured about the steering column.

Referring now to the drawings, there is shown a conventional steering column 10 and ignition lock 12 such as is found in the more recent models of automobiles manufactured in this country. A flasher button 14 is also typically shown extending from the steering column 10. The safety shroud in accordance with the present invention covers the ignition lock 12 to prevent theft of the vehicle. When the shroud is in place on the column, it covers the ignition lock 12 and a burglar cannot force the lock as it is inaccessible. Therefore, the steering column is maintained in its locked position and even if the burglar is able to start the car, the car cannot be driven as the steering remains locked.

The safety shroud generally comprises a housing 16 and a C-shaped band 18. As shown in the drawings, the band 18 surrounds the steering column on the side opposite to the ignition lock 12 and the legs 26 and 28 fit into slots in opposite sides of the housing 16. The C-shaped band 18 is secured in place relative to the housing by means of a pair of latching devices 20 which are suitably pivotally mounted in the housing, one on each side of the housing adjacent the respective legs 26 and 28 of the band 18.

Each of the latching devices 20 includes a pivotal support member 21 which may include a pivot rod and end support blocks. Each latching device 20 includes a shoulder 22 that engages with a slot 24 on each of the legs 26 and 28 of the C-shaped band. A spring 23 associated with each latching device biases the latch so that the shoulder 22 moves into the slot 24 when the housing and band are interengaged.

A conventional key lock 30 is mounted in the housing 16. To accommodate the lock 30 there is provided a passage in the housing and a nut 31 secures the lock 30 in place. The rotating barrel of the lock includes tabs 33 and 35 which have cables 32 and 34 connected thereto respectively. The other ends of each of the cables 32 and 34 couple to the separately spaced latching devices 20. When the lock 30 is turned, the cables 32 and 34 pull the latching devices against the bias of the spring 23 so as to cause their shoulders 22 to disengage from the slots 24 so that the housing may be pulled from the C-shaped strap or band 18.

There is also preferably provided within the housing a wall which is partition 36 which is suitably supported in the housing. This partition 36 carries a plunger 38 which is loaded by means of spring 39. When the housing and band are moved into their locked position, the plunger 38 engages against the steering column 10 against the bias of spring 39. When the lock 30 is opened, the loaded plunger 38 forces the housing 16 off the end of the strap or band 18. This facilitates easier removal of the two components of the device.

The device may be mounted to the steering column about the ignition lock in two alternate positions. It is preferred that the housing 16 be positioned on the strap so that the opening 40 for the key faces the dash board of the vehicle. In this way, there is little space provided between the opening 40 and the dash board so that it would be difficult for a burglar to use a screw driver or other implement for forcing the lock 30 so as to jimmy the device open.

When the device has been opened it can be removed from the steering column completely and stored someplace in the vehicle such as in the vehicle glove compartment. Alternatively, it is just as easy to reconnect the device about the bottom of the steering column.

Having described one embodiment of the present invention, it should now be apparent to those skilled in the art that numerous other embodiments and modifications of the one shown herein are contemplated as falling within the spirit and scope of the present invention.

What is claimed is:

1. An ignition safety lock for an automobile having the ignition lock on the steering column, said lock comprising;
   a C-clamp sized to extend about the steering column on the side opposite the ignition lock and having a pair of arms that extend generally tangentially from the column on opposite sides of the ignition lock,
   a shroud in the form of a housing adapted to removably receive the arms of the clamp, said housing enclosing the steering column ignition lock when it receives the arms of the C-clamp,
   latching means carried by the clamp and housing for releasably latching the arms and housing together in a position wherein the housing encloses the vehicle ignition lock,
   and a lock means carried in the housing and connected to the latching means for releasing the latching means to remove the shroud from covering the ignition lock.

2. An ignition safety lock as defined in claim 1 wherein said latching means includes means defining a slot in the end of each arm and a pair of latches mounted in the housing adjacent each slot.

3. An ignition safety lock as defined in claim 2 including means for pivotally supporting each latch toward the slot when the clamp and housing interengage.

4. An ignition safety lock as defined in claim 1 wherein said housing has a passage through a wall defining the housing for receiving the lock means.

5. An ignition safety lock as defined in claim 4 wherein the opening in the lock means for receiving a key faces the vehicle dash board when the clamp and housing are relatively locked.

6. An ignition safety lock as defined in claim 3 wherein said lock means includes a rotatable barrel.

7. An ignition safety lock as defined in claim 6 including means connecting the barrel to the latches.

8. An ignition safety lock as defined in claim 7 wherein said means connecting includes a pair of cables, one connecting to each latch so that upon rotation of the barrel the cables pull the latches to release the latches and permit separation of the clamp and housing.

9. An ignition safety lock as defined in claim 8 wherein said barrel has oppositely disposed tabs for connecting to each cable.

10. An ignition safety lock as defined in claim 1 including a loaded release means and means for mounting the loaded release means in the housing for engagement with the steering column whereby the release means tends to separate the housing and clamp when the lock is opened.

11. An ignition safety lock as defined in claim 10 wherein said loaded release means includes a plunger, a spring for urging the plunger toward the steering column when the clamp and housing are interengaged and means supporting the plunger in position in the housing.

* * * * *